US006735660B1

(12) United States Patent
Osten et al.

(10) Patent No.: US 6,735,660 B1
(45) Date of Patent: May 11, 2004

(54) SIDEBAND SIGNAL TRANSMISSION BETWEEN HOST AND INPUT/OUTPUT ADAPTER

(75) Inventors: Thomas James Osten, Rochester, MN (US); Gregory Scott Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 09/747,081

(22) Filed: Dec. 21, 2000

(51) Int. Cl.[7] .......................... G06F 13/38; G06F 13/40
(52) U.S. Cl. ........................ 710/305; 710/62; 710/313; 361/686
(58) Field of Search .................. 710/305, 52, 300, 710/72, 315, 62, 313; 375/220; 370/490; 361/683, 686, 733, 737, 736; 713/300

(56) References Cited

U.S. PATENT DOCUMENTS 5,644,734 A * 7/1997 Hong
5,764,924 A * 6/1998 Hong
6,182,168 B1 * 1/2001 Guthrie

OTHER PUBLICATIONS

Allen et al., *Vendor Unique Differentiation Using PCI Sideband Signals*, U.S. patent application Ser. No. 09/149,043, filed Sep. 8, 1998, U.S. patent No. 6,237,048.

* cited by examiner

Primary Examiner—Gopal C. Ray
(74) Attorney, Agent, or Firm—Wood, Herron & Evans, LLP (57) ABSTRACT

Sideband communication capability is incorporated into an Input/Output Adapter (IOA) and/or a host apparatus in a manner that permits the communication of base I/O and other sideband signals between an IOA and a host apparatus without conflicting with standard IOA and/or I/O architecture form factors. The primary connector of an IOA may be selectively partitioned to permit sideband information to be communicated across the primary connector, often without compromising the primary communication functionality of the primary connector. In lieu of or in addition to such a partitioned connector, a second, sideband connector may be incorporated into an IOA and/or host apparatus.

43 Claims, 2 Drawing Sheets

SIDEBAND SIGNAL TRANSMISSION BETWEEN HOST AND INPUT/OUTPUT ADAPTER

FIELD OF THE INVENTION

The invention is generally directed to computers and input/output adapters for use therewith, and in particular, to the transmission of sideband signals between computers and industry standard input/output adapters.

BACKGROUND OF THE INVENTION

Interconnectivity between devices within a computer or other data processing system is often as critical or more critical to system performance than the performance of the individual devices. For example, great advances have been made in the performance of microprocessors, including increasingly-higher clock speeds and improved instruction throughput. Yet, even if a microprocessor is able to process instructions and data at a faster rate than previous designs, if the microprocessor cannot be fed instructions and data fast enough to match the performance of the microprocessor, the overall performance of a data processing system may not substantially improve.

One particular area of concern in many data processing systems is that of input/output (I/O) connectivity between the primary processor/memory complex of a data processing system and various external devices such as storage devices, display devices, external networks, I/O processors, service processors, etc. One solution for providing such connectivity is the Peripheral Component Interconnect (PCI) architecture, an industry standard architecture that is principally used to interface a processor/memory complex of a data processing system to various external devices through dedicated input/output adapters (IOA's) coupled over a shared bus.

An IOA, in this context, is typically implemented as a printed circuit board, incorporating a male-type edge connector including a plurality of electrical contacts and suitable for mechanical and electrical engagement within a female-type connector mounted to a motherboard, backplane or other structure housed within a computer enclosure. The location within which the IOA is inserted into the enclosure is typically referred to as a slot, and for complex systems, multiple slots are typically provided in close proximity to one another and served by a backplane. To provide an interface to an external device, an IOA typically also includes a tailstock including one or more additional connectors, although additional connectors may not be included on a tailstock on some IOA's. The printed circuit card of an IOA typically includes logic for driving the connections to the PCI bus and to any external devices, and may include additional logic circuitry, even that of the external device itself.

Due to the inherent performance limitations of a shared bus, which are not particularly relevant to an understanding of the invention, other higher performance I/O architectures have been developed, but which still use IOA's as a predominant component in interconnecting multiple devices to one another. For example, the InfiniBand standard defines a high-speed serial, channel-based, message-passing, scalable switched fabric that is likely to replace the PCI standard in high performance applications such as server and other multi-user environments. With the InfiniBand standard, all systems and devices (called nodes) attach to the fabric through channel adapter logic. Host servers typically attach using IOA's referred to as Host Channel Adapters (HCA's), while target devices attach using IOA's referred to as Target Channel Adapters (TCA's). One or more switches can connect any number of hosts and target devices to provide a highly reliable fabric. The benefits of the InfiniBand architecture include, among other benefits, easier and faster data connectivity, built-in quality of service and improved usability.

In addition to the interconnectivity provided by IOA's and associated I/O architectures, data processing systems may also have a need for additional external interconnectivity, particularly to provide system administration, servicing and diagnostics services via a variety of 'base' I/O signals driven from motherboards, backplanes, service processors, and enclosure services processors to the backplate of the system chassis (typically proximate to the tailstocks of the installed IOA's. The backplates typically secure cable connectors to drive various base I/O signals to devices external to the system chassis. Examples of base I/O signals include GPIO (general purpose I/O), Modems, LAN's, parallel ports, USB ports, JTAG ports, and associated other serial ports. These 'base' ports are typically used for system administration connections, enclosure services connections, certain peripheral connections, and service connections. In many instances, unlike IOA signals, base I/O signals are generally available and functioning before main power is available to an IOA and before the primary Operating System in a data processing system is booted.

In designing and developing a data processing system component such as a computer chassis, architects often face a dilemma in choosing how to provide base I/O functionality, i.e., what function to choose for different makes and models, which interfaces should be featurable (pluggable), and which should 'escape' the chassis from an IOA tailstock or escape through the stamp-outs in the chassis backplate.

Designers and architects of data processing systems typically favor a high degree of flexibility when making decisions and tradeoffs. In the context of base I/O connectivity, one tradeoff that is desired but seldom available is to 'snap-in' a base I/O function using a pluggable "industry-standard" form factors, e.g., the same form factors used by IOA's. Doing so is desirable as a design may be able to leverage industry standard mechanical components, differentiate a product offering for competitive advantage, reduce a rack drawer height (e.g., by using an IOA slot instead of drawer space under the IOA chassis slots), and obtain maximum flexibility in deciding how and where to locate base I/O external connections. Moreover, a 'snap-in' itself may have a commercial value since it is based on industry standards, and since the flexibility is provided to plug the 'snap-in' into a normal industry-standard IOA slot and/or backplane connector.

While providing such 'snap-in' functionality is desirable, often with many industry standard I/O architectures, e.g., PCI and InfiniBand, every single 'pin' or signal path on the pluggable interface between a backplane and an IOA is defined, or reserved for future enhancements to the standard. The signal paths are defined by the respective standards to satisfy PCI bus and InfiniBand link signaling and leave no room for additional signals (herein referred to as "sideband" signals) not specifically tailored to those I/O architectures. Were a reserved pin used for sideband communication, later revisions of the underlying standard could introduce design conflicts that could obsolete either an IOA or backplane design.

Some prior attempts to provide base I/O communication in connection with industry standard IOA's have focused on allocating space in a chassis backplate for DB9, parallel, serial, RJ11, RJ45, modem, etc. connectors on the rear of a chassis, and with cabling utilized to interconnect such connectors with driving logic circuitry disposed in the chassis. Should a manufacturer choose to support multiple models of a particular data processing system design, however, often excess backplate space must be reserved to ensure sufficient space for the external connectors required by different models based on a particular design. Other prior attempts utilize cabling to couple the driving logic circuitry for a chassis to various IOA's for external connectivity through the IOA's tailstocks. Still other configurations attempt to cable IOA form factor derivatives to each other or to the backplane using cables.

Therefore, there exists a need for a manner of enabling base I/O communication with a data processing system, and in particular in such a manner that leverages existing industry standard IOA form factors while maintaining compatibility with such industry standards.

SUMMARY OF THE INVENTION

The invention addresses these and other problems associated with the prior art by incorporating sideband communication capability into an Input/Output Adapter (IOA) and/or a host apparatus in a manner that permits the communication of base I/O and other sideband signals between and among an IOA and/or a host apparatus in a manner that does not conflict with standard IOA and/or I/O architecture form factors.

Consistent with one aspect of the invention, the primary connector of an IOA is selectively partitioned to permit sideband information to be communicated across the primary connector, often without compromising the primary communication functionality of the primary connector. In particular, sideband configuration information, which identifies at least one contact on the primary connector that is adapted for sideband communication, is maintained within an IOA and is capable of being conveyed to a host apparatus. Based upon such sideband configuration information, a subset of signal paths in the host apparatus may be selectively configured for sideband communication.

Also, an IOA consistent with this aspect of the invention may include tri-state logic coupled to a subset of the contacts in a primary connector that is adapted for sideband communication, as well as configuration logic capable of outputting the sideband configuration information for the IOA.

An apparatus consistent with this aspect of the invention may include a slot connector configured to electrically and mechanically engage a primary connector on an IOA, and control logic configured to receive the sideband configuration information from the IOA via the slot connector and selectively configure a subset of the contacts on the slot connector for sideband communication based on the sideband configuration information.

Consistent with another aspect of the invention, a second, sideband edge connector may be incorporated into an IOA in connection with a first, primary edge connector coupled to a circuit board substrate of the IOA. The sideband edge connector may be configured to extend in the same direction as the primary edge connector (generally along an insertion axis), but may be laterally offset from the primary edge connector transversely from the insertion axis and along a plane defined by the circuit board substrate.

A cooperative apparatus suitable for receiving such an IOA may include a slot connector configured to electrically and mechanically engage the primary edge connector of the IOA, and a sideband connector offset from the slot connector in much the same manner as the sideband edge connector is offset from the primary edge connector on the IOA.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
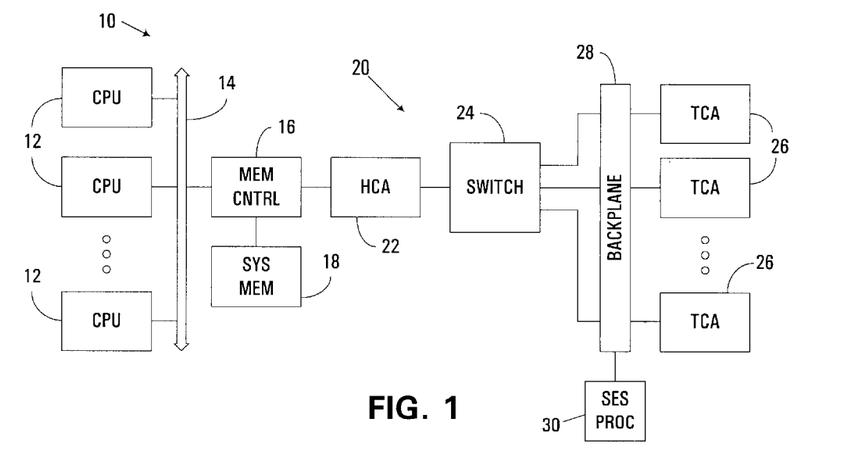
FIG. 1 is a block diagram of an apparatus incorporating an input/output adapter (IOA) having sideband signal transmission capability consistent with the invention.

Turning to the Drawings, wherein like numbers denote like parts throughout the several views, FIG. 1 illustrates an exemplary apparatus 10 suitable for the transmission of sideband signals with one or more input/output adapters (IOA's) in a manner consistent with the invention. Apparatus 10 in some embodiments may also be referred to as a "host" apparatus in that apparatus 10 may be capable of hosting, or interfacing with, one or more IOA's (e.g., a host channel adapter (HCA) 22 and a plurality of target channel adapters (TCA's) 26). As such, the invention may be implemented in practically any electronic system capable of hosting or interfacing with IOA's, e.g., any of a number of single- or multi-user computers such as desktop computers, laptop computers, portable computers, workstations, network servers, midrange computers, mainframe computers, etc., or other forms of data processing systems such as clustered computer systems, distributed computer systems, storage systems, system controllers, and various other programmable electronic devices.

Apparatus 10 generally includes a processor/memory complex including one or more central processing units (CPU's) 12 coupled via a host interconnect 14 to a memory controller 16. Memory controller 16 provides access to a system memory 18, as well as to an input/output (I/O) subsystem 20 capable of providing external input and output functionality for the processor/memory complex.

In the illustrated embodiment, I/O subsystem 20 is implemented using an InfiniBand-compatible architecture, including a host channel adapter (HCA) 22 that interfaces memory controller 16 with a high speed serial switch 24, and providing a channel-based, switched-fabric, point-to-point, full-duplex serial interconnect architecture for ultimately interfacing the processor/memory complex with a plurality of target channel adapters (TCA's) 26 coupled to switch 24 through a backplane 28. In the illustrated implementation, the backplane includes a plurality of "slots" capable of receiving and communicating with compliant IOA's, typically via a slot connector configured to mate with a corresponding primary connector on an IOA. Given that other components, e.g., motherboards, daughterboards, etc., may also include multiple slots, and that a single connector by itself may constitute a "slot" within the context of the invention, the invention is not limited to use with a backplane specifically configured to receive multiple IOA's.

The discussion hereinafter will therefore focus on an implementation of the invention in providing I/O functionality within an InfiniBand environment. As will become more apparent below, however, the invention may be utilized in connection with practically any standardized I/O environment where it is desirable to incorporate sideband signal transmission capability, e.g., the Peripheral Component Interconnect (PCI) architecture with SMBus 2.0 capability, or any other I/O architecture with 12C or other support interfaces running off of auxiliary or standby power.

The embodiments described hereinafter enhance the capabilities of an industry standard I/O architecture to support the transmission of sideband signals, e.g., base-I/O signals such as general purpose I/O (GPIO), modem signals, network signals, parallel port signals, Universal Serial Bus (USB) signals, JTAG signals, RS232 signals, address, data and control signals, and other signals used to provide additional connectivity in an apparatus such as for system administration connections, enclosure services connections, peripheral connections, service connections, master/slave or peer communications, etc. Moreover, sideband signals may be used in some embodiments to provide local and specific communication and control between a host apparatus and an IOA itself, as well as communication and control directly between IOA's.

In connection with the description herein, base I/O signals may be generally distinguished from IOA signals in that base I/O signals are generally configured, available and functioning before main power is available to the IOA's of an apparatus, and often prior to the primary operating system of an apparatus being booted, but it is not limited by these conditions.

The embodiments discussed hereinafter may incorporate a predominantly electronic methodology and/or a predominantly mechanical methodology to provide sideband signal capability with an InfiniBand-compatible I/O subsystem. The predominantly electronic methodology, which is also referred to herein as a partitioned interface methodology, is described in connection with FIGS. 2–3. The predominantly mechanical methodology, which is also referred to herein as an additional interface methodology, is described in connection with FIGS. 4–5.

Partitioned Interface Methodology

The partitioned interface methodology discussed herein implements sideband communications predominantly through the use of standardized signal paths that are unused in certain instances in an InfiniBand or other industry-standard connector applications. The partitioned interface methodology therefore enables sideband communications to be performed in instances where signal paths that might otherwise be used in some implementations of an industry-standard connector are in fact not used or required.

For example, with the InfiniBand architecture, three bus widths are supported, including 1x (4 wires, 2 pair), 4x (16 wires, 8 pair), and 12x (48 wires, 24 pair), all of which are capable of being accessed through a single design of mechanical backplane connector. Therefore, a 1x capable IOA and 1x capable backplane will have up to 44 unused and available signal positions. Similarly, a 4x capable adapter and 4x capable backplane will have up to 32 unused and available signal positions. Some or all of the unused signal positions may be "borrowed", or made available, for sideband communications, making their use transparent to the underlying industry standard primary connection architecture.

In addition, the InfiniBand standard, like many other standardized I/O architectures, includes support for system management (SM) busses (e.g., the 12C bus), extra interrupts and auxiliary power, which are made available through the standardized InfiniBand connector form factor. The auxiliary power may be used to energize Vital Product Data (VPD) storage and support Wake-On-LAN functions on an IOA. Other power pins are used to supply the main power for the primary IOA circuits. Specifically with regard to InfiniBand connections, twelve low speed signal paths are defined, over which power, ground, auxiliary power (VA__ In), power enable (VBxEn__L), system management (SM) bus (IMxClk, IMxDat), and presence (ImxPRst) are conveyed.

To implement sideband communication in the manner discussed herein, an IOA is defined to include either a 1x or 4x InfiniBand bus, or optionally, to omit any InfiniBand bus communications functionality on the IOA whatsoever so that only the mechanical aspects of an InfiniBand-compatible form factor are used.

Figure 2:
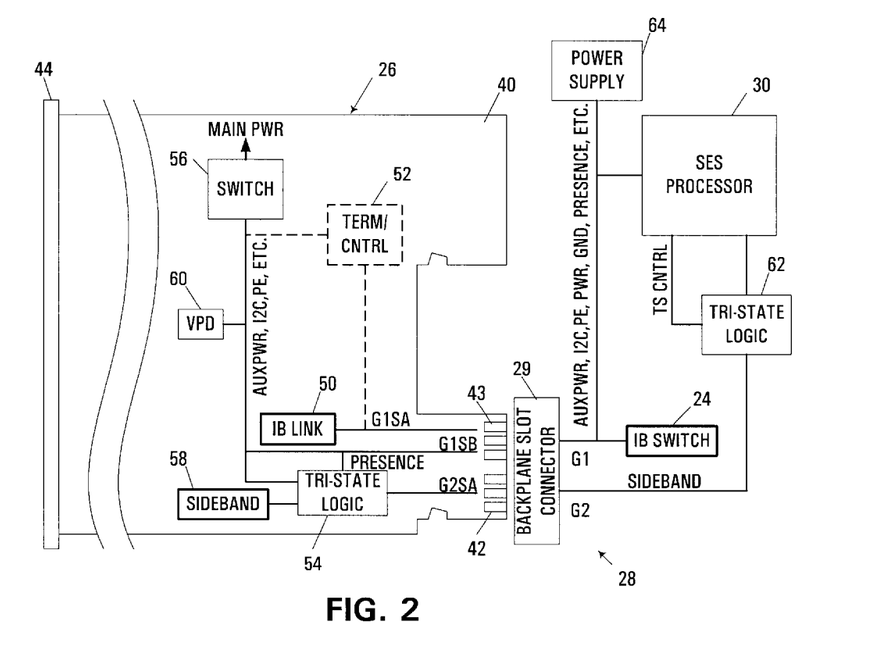
FIG. 2 is a block diagram of the System Enclosure Services (SES) processor and an IOA from the apparatus of FIG. 1, incorporating partitioned sideband communications over a subset of the signal paths defined for a primary connector on the IOA.

As shown in FIG. 2, an IOA (here one of TCA's 26) includes a circuit board substrate 40 with a primary connector 42 incorporating a plurality of contacts 43 for coupling the IOA to the InfiniBand-compatible signal paths disposed within a backplane slot connector 29 defined in a slot on backplane 28. For InfiniBand connections, as an example, sixty contacts 43 are defined on primary connector 42 to mate with 60 matching contacts on the backplane slot connector 29. IOA 26 also optionally includes a tailstock 44 through which external communication with the IOA is permitted. As used hereinafter, the term "primary connector" will be used to designate the connector on an IOA that complies with an industry standard protocol and pin assignment. Likewise, the term "slot connector" will be used to designate a mating connector on a backplane, motherboard, or structure that is capable of interfacing with an IOA according to a particular industry standard I/O architecture, consistent with the conventional usage of the term "slot" to mean structure capable of receiving an IOA to provide electrical and mechanical between the IOA and an apparatus.

To support sideband communications consistent with the invention, the signal paths defined by the InfiniBand standard are partitioned into two principle groups: Group I (G1) and Group II (G2). The Group I signals include the normal InfiniBand signal set. Group II includes those signal paths borrowed from the high speed wire pairs that are required to implement a particular function using sideband signals. Thus, if the IOA is configured to support a 1x InfiniBand bus with, the Group II signals may include up to forty-four signal paths. Likewise, a 4x capable adapter may include up to thirty-two signal paths. In the alternative, if the IOA uses no InfiniBand link capability, up to forty-eight signal paths may be used for sideband communications.

From the standpoint of the IOA, the Group I signals are broken into two subgroups, designated herein as Subgroup A (G1SA) and Subgroup B (G1SB), with the former including utilized InfiniBand bus signal paths and the latter incorporating, at a minimum, the auxiliary power, 12C, presence and power enable signals provided by the backplane of the apparatus. For the Group II signal paths, any of such signals that are utilized for sideband communications are designated herein as Subgroup A (G2SA) signals, with any unused signals being defined within a Subgroup B of Group II (not shown in FIG. 2).

IOA 26 includes InfiniBand link logic 50 coupled to the G1SA signals. Logic 50 incorporates conventional circuitry utilized to provide communications over an InfiniBand bus. In the alternative, if no InfiniBand communication capability is included on the IOA, an optional termination/control block 52 may be utilized in lieu of logic 50 to appropriately terminate and control the unused InfiniBand signal paths.

The G1SB signals, on the other hand, are passed to a tri-state logic block 54 and a power switch 56, and are capable of being selectively coupled to sideband logic block 58, which includes any desirable logic circuitry for controlling and otherwise utilizing sideband communications. Tri-state logic block 54, which may be responsive to the presence, auxiliary power, 12C and/or power good signals, is used to selectively tri-state the sideband signals to a high impedance state. By providing tri-state functionality, the IOA is capable of being plugged into non-sideband signal enabled InfiniBand backplane slots without generating an error, albeit with reduced functionality in many instances. Such tri-state logic may be omitted in some embodiments.

Tri-state block 54 is coupled intermediate the G2SA signals and a sideband logic block 58, which includes any desirable logic circuitry for controlling and otherwise utilizing sideband communications. Thus, logic block 54 selectively tri-states the sideband signals to and from a high or low impedance state.

Switch 56 is utilized to control the main power supplied to the IOA, and is used to selectively apply power to the IOA responsive to the power enable (PE) signal supplied from the slot connector. In the illustrated implementation, based on the InfiniBand standard, two-stage power is supported, whereby a source of auxiliary power is provided whenever an IOA is plugged into a slot connector, even when the IOA is not "awake" from the standpoint of an operating system.

IOA 26 also includes vital product data (VPD) defined in a VPD block 60, which provides, in addition to conventional VPD information, sideband configuration information that defines the sideband capabilities of the IOA. The sideband configuration information may include information such as the width of the InfiniBand bus (1x, 4x or 12x), the assignment of sideband signals to particular signal paths, etc. In the alternative, a make or model identifier for the IOA could be provided as sideband configuration information so that a host system could access a database to obtain relevant configuration information for the particular type of IOA. Furthermore, rather than utilizing VPD logic, other types of configuration logic may be used to provide sideband configuration information, e.g., one or more jumpers, a ROM or other memory device, etc.

From the standpoint of backplane 28, a system management controller (SMC) such as a System Enclosure Services (SES) processor 30 is coupled to backplane 28 to provide intelligent system management control throughout the backplane. In some embodiments, the SES processor may be incorporated into a service processor, e.g., the SPCN processor on an AS/400 midrange computer available from International Business Machines Corporation. Other forms of control logic may be used to handle the retrieval of sideband configuration information and the configuration of specific signal paths and/or contacts for sideband communication consistent with the invention.

Backplane 28 includes a cooperative tri-state logic block 62 that is used to selectively place the sideband signal paths to a high impedance state until the slot to be polled by the backplane (specifically the SES processor) detects the sideband capabilities (if any) of the IOA.

As shown in FIG. 2, SES processor 30 may be used to provide both the tri-state control signals for logic block 62, as well as the actual sideband signal paths. In other embodiments, however, other logic may be utilized to interface with the sideband signal paths. Put another way, the management of sideband communications from the standpoint of the host may be handled by circuitry other than the SES processor.

SES processor 30 is also coupled to the G1 signal paths, along with a power supply 64, to provide the low speed signal paths such as auxiliary power, 12C, PE, power, ground, presence, etc. The InfiniBand link signal paths are provided by InfiniBand switch 24, which has the general configuration and operation as discussed above in connection with FIG. 1.

Figures 3, 4:
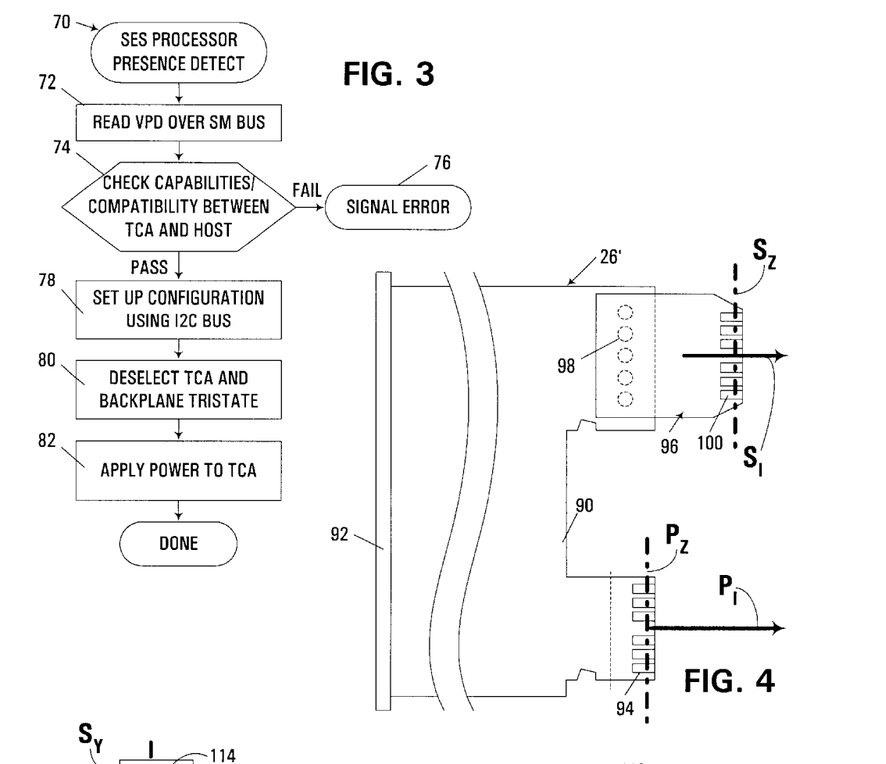
FIG. 3 is a flowchart illustrating the program flow of an IOA initialization routine executed by the SES processor of FIG. 2 in response to detection of the IOA in an I/O slot of the apparatus.
FIG. 4 is a fragmentary side elevational view of an alternate IOA to that of FIG. 2, and incorporating a supplemental sideband connector for transmitting sideband signals.

Using the aforementioned logic circuitry, an InfiniBand-compatible slot in a backplane or other chassis interconnect may be dynamically configured for use with a sideband communications-capable IOA using a process similar to an IOA initialization routine 70 executed by the SES processor in response to detection of an assertion of the presence signal due to the primary connector of an IOA being plugged into a mating slot connector in the backplane. Configuration of the slot therefore partitions the signal paths coupled to the slot connector into InfiniBand link and sideband partitions. Once partitioned, independent and concurrent InfiniBand and sideband communications may be performed over the respective partitions.

Specifically, it will be appreciated that auxiliary power is conventionally made available to the computer, the SES processor, as well as any IOA adapter coupled to a backplane slot. In the illustrated embodiment, whenever a slot is empty or no IOA has been initialized in the slot, the SES processor controls the tri-state logic to set all sideband signal pairs to a high impedance state. Once a sideband-capable IOA is inserted in a slot, a presence detect signal will both immediately tri-state the sideband signal paths on the IOA through control of tri-state logic block 54 (FIG. 2), and notify the SES processor that an IOA has been inserted in the slot and is ready to be initialized.

Upon detection of the assertion of a presence signal, routine 70 begins in block 72 by reading the VPD information from the IOA over the 12C bus to determine what the capabilities of the IOA are. For example, the SES processor may determine that the IOA is sideband-capable and requires a functional 1x InfiniBand link. The VPD may also indicate that a number of other signal paths are allocated for sideband communications, e.g., wire pairs 3 and 4 might be used to drive an RS232 connection to a DB9 connector on the tailstock. An innumerable number of sideband capabilities, definitions and formats may be defined by the VPD consistent with the invention.

Next, in block 74, the SES processor checks the relative capabilities and the compatibility between the IOA and the host apparatus, including the slot connector capabilities and/or other capabilities of the host apparatus. Doing so ensures that the computer and slot are fitted with the hardware and software necessary to properly operate the type of IOA installed in the slot.

If the check in block 74 fails, control passes to block 76 to signal an error, typically in any of a number of manners known in the art. Otherwise, if the check passes, block 74 passes control to block 78 to set up any initial configuration for the slot and the corresponding IOA through the 12C bus to prepare for sideband communications. Specifically, various signal paths and contacts are typically configured to communicate sideband signals, although in some instances no particular configuration operations may need to be performed for some signal paths or contacts.

Next, in block 80, the SES processor deselects both sets of tri-state logic (in the IOA and backplane) using the 12C bus and TS control lines, respectively. Next, block 82 switches on the main or primary power to the IOA using the power enable control signal. Once power is applied to the IOA, the IOA will initialize itself and initiate communications with the host apparatus, in a manner well known in the art.

In other embodiments, deselection of the tri-state logic may occur at other points in time subsequent to detection of the sideband configuration information, e.g., after switching on the main power to the IOA.

It should also be noted that other industry-standard connectors may be enabled for partitioned sideband communications in a manner consistent with the invention. For example, the PCI standard defines both 32-bit and 64-bit bus widths, with the 64-bit bus width supported in part through the addition of 64-bit extension signals to an earlier PCI specification. Thus, it may be possible when using 64-bit PCI-compatible connectors to support sideband communications within the 64-bit extension signals whenever an IOA and slot are configured to utilize a 32-bit PCI bus, thereby defining PCI bus and sideband partitions for the signal paths coupled to the slot connector.

Some variations of the PCI standard also incorporate a derivative of the 12C bus known as the SM bus, as well as the addition of an auxiliary power signal. As such, a routine similar to routine 70 of FIG. 3 may be used for PCI applications as well. In some instances, an off-card PCI hot plug controller may be used in place of, or in addition to, the SES processor. Also, a PCI interface may not include a power enable pin, whereby the SES processor would either have to enable an on-IOA regulator through 12C, or an off-card PCI hot plug controller and regulator, to turn on main power to the IOA.

By partitioning signal paths within an industry-standard primary connector to support sideband communications over the primary connector, no mechanical changes from the industry standard form factor are typically required to either the IOA form factor or the associated slot. Other modifications will be apparent to one of ordinary skill in the art.

Additional Interface Methodology

In addition to or in lieu of the partitioned interface methodology discussed above, an additional interface methodology may be utilize to extend an industry-standard IOA form factor for use with sideband communications, typically through the addition of a supplemental connector that extends in generally the same direction as the primary connector for an IOA, but laterally offset therefrom in a direction transverse from the primary connector and along a plane defined by the underlying circuit board substrate. As shown in FIG. 4, for example, an alternate IOA 26' may include a circuit board substrate 90 incorporating a tailstock 92 and a conventional InfiniBand-compatible primary edge connector 94. In the illustrated implementation, a paddle card 96 is secured to the substrate through a plurality of electrical and mechanical connections 98 (e.g., solder pads or bumps) to provide a sideband edge connector 100.

It should be noted that the direction of insertion of each of the primary and sideband edge connectors (denoted $P_i$ and $S_i$) extends in the same general direction, in particular along an insertion axis along which the IOA is moved to engage the IOA with a backplane slot connector.

Figure 5:
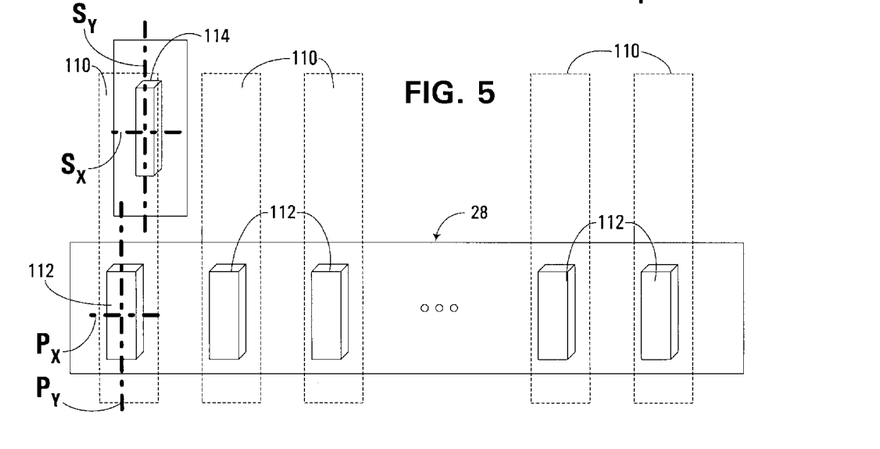
FIG. 5 is a front elevational view of a backplane including a sideband-enabled I/O slot suitable for interfacing with the IOA of FIG. 4.

FIG. 5 illustrates a cooperative backplane arrangement including backplane 28, which includes a plurality of slots 110, each incorporating an InfiniBand-compatible slot connector 112 adapted for electrical and mechanical engagement with the primary connector of an InfiniBand-compatible IOA. Each slot 110 generally refers to a position along the backplane, which may include guide rails, an enclosure aperture, etc., that define the available space within an apparatus that an IOA may be housed. Each slot is illustrated in phantom in FIG. 5 to simplify the illustration, although it will be appreciated that additional structure will typically project out of the page to support the engagement of an IOA within a slot of the backplane.

Each slot 110 may be of conventional design, or may incorporate an additional sideband connector such as connector 114 shown in the left-most slot of the backplane. Sideband connector 114 is positioned to mechanically and electrically engage sideband edge connector 100 of IOA 26' (FIG. 4) when primary edge connector 94 of the IOA engages backplane slot connector 112.

The relative arrangement of edge connectors 94, 100, as well as that of the slot and sideband connectors 112, 114, may vary in different embodiments. For example, in the implementation illustrated in FIGS. 4 and 5, the respective connectors on each of the IOA and backplane are offset laterally relative to the plane of the circuit board and transverse to the insertion direction, as represented by axes $P_x$ and $S_x$. Moreover, by virtue of a surface-mount paddle card interconnect implementation for the sideband edge connector, it may also be desirable to offset the respective slot and sideband connectors on the backplane transversely to the plane of the circuit board, as represented by axes $P_y$ and $S_y$. Furthermore, it may be desirable to vary the distance that each edge connector 94, 100 extends along the direction of insertion, as represented by axes $P_z$ and $S_z$.

In other embodiments, however, the relative arrangements of the connectors may vary. For example, if sideband edge connector 100 is simply formed on a tab defined on circuit board 90, typically each connector 94, 100 would lie in the same plane. Other relative arrangements may be used in the alternative.

An important aspect of the IOA and backplane arrangement shown in FIGS. 4 and 5 is the fact that the mechanical integrity of the specified InfiniBand-compatible IOA form factor dimensions is preserved, as the additional connectors are located in an area where no connection is specified by the InfiniBand form factor standard. Therefore, often the enclosure space intruded into by the paddle card of an installed IOA can be opened and made available for the necessary interconnection to complete the sideband connections with a host. It should also be noted that the use of a primary connector is optional, so long as the other form factor requirements of the InfiniBand standard are met by the IOA.

An advantage of the herein described additional interface methodology is the use of a completely separate connector to transfer sideband signals, which requires no loss in InfiniBand connector capability, as well as the elimination of a need for an apparatus enclosure to have an intelligent system management controller installed to handle the backplane functionality (although one may be used in some embodiments). Furthermore, as will be discussed in greater detail below, installation of a sideband-capable IOA in the manner discussed herein typically requires no additional steps to seat both the primary and sideband edge connectors of an IOA.

The manner in which the sideband edge connector 100 may be secured to circuit board substrate 90 may vary in different applications. For example, various packaging or circuit board interconnectivity techniques such as multichip module bonding techniques, surface mount bonding techniques, wire bonding, solder bump bonding, rivets, screws, locking connectors, conductive adhesives, etc., may be used to secure paddle card 96 to circuit board 90. Moreover, as discussed above, the sideband edge connector may be formed from a tab or extension of the primary substrate, whereby the substrate of the connector is integral to that of the circuit board.

Moreover, it will be appreciated that various connector designs may be incorporated to transmit sideband signals consistent with the invention. The design of FIG. 4, for example, illustrates an edge-type connector including electrical contacts disposed on one or both sides of the substrate, and with the connector configured to be received within a female-type connector via a "stab" operation. Other types of connectors, e.g., to interface with different types of cables, terminations, or other mating connectors, may also be used in the alternative.

Various modifications may be made to the herein described embodiments without departing from the spirit and scope of the invention. For example, the aforementioned additional interface methodology may be applied to other industry-standard IOA's, including, for example, the PCI form factor.

Other modifications will be apparent to one of ordinary skill in the art.

What is claimed is:

1. A method of configuring an apparatus for communication with an Input/Output Adapter (IOA) of the type including a primary connector including a plurality of contacts configured to interface with a plurality of signal paths in the apparatus, the method comprising:
   (a) receiving sideband configuration information from the IOA, the sideband configuration information identifying at least one contact on the primary connector adapted for sideband communication;
   (b) based on the sideband configuration information of the IOA, selectively configuring a subset of the plurality of signal paths in the apparatus for sideband communication; and
   (c) based on the sideband configuration information of the IOA, configuring the IOA to selectively enable a subset of the plurality of contacts in the primary connector for sideband communication.

2. The method of claim 1, wherein the IOA is compliant with an industry standard Input/Output (I/O) architecture.

3. The method of claim 2, further comprising communicating sideband information between the IOA and the apparatus over the subset of the plurality of signal paths concurrently with communicating information associated with the industry standard I/O architecture over other signal paths from the plurality of signal paths.

4. The method of claim 1, wherein receiving the sideband configuration information includes retrieving vital product data (VPD) from the IOA through the primary connector.

5. The method of claim 1, wherein the plurality of signal paths in the apparatus are routed to the primary connector of the IOA through a slot connector.

6. The method of claim 5, further comprising checking compatibility of the IOA with the apparatus prior to selectively configuring the subset of the plurality of signal paths in the apparatus for sideband communication.

7. A method of configuring an apparatus for communication with an Input/Output Adapter (IOA) of the type including a primary connector including a plurality of contacts configured to interface with a plurality of signal paths in the apparatus, the method comprising:
   (a) receiving sideband configuration information from the IOA, the sideband configuration information identifying at least one contact on the primary connector adapted for sideband communication; and
   (b) based on the sideband configuration information of the IOA, selectively configuring a subset of the plurality of signal paths in the apparatus for sideband communication;
   wherein the IOA is compliant with the PCI standard, wherein the plurality of signal paths in the apparatus includes a plurality of 64-bit extension signals, and wherein selectively configuring the subset of the plurality of signal paths for sideband communication includes partitioning the plurality of signal paths into a 32-bit wide PCI bus partition and a sideband partition including at least one sideband signal path from the 64-bit extension signals.

8. A method of configuring an apparatus for communication with an Input/Output Adapter (IOA) of the type including a primary connector including a plurality of contacts configured to interface with a plurality of signal paths in the apparatus, the method comprising:
   (a) receiving sideband configuration information from the IOA, the sideband configuration information identifying at least one contact on the primary connector adapted for sideband communication; and
   (b) based on the sideband configuration information of the IOA, selectively configuring a subset of the plurality of signal paths in the apparatus for sideband communication;
   wherein the IOA is compliant with the InfiniBand standard, wherein the plurality of signal paths in the apparatus includes 1X, 4X and 12X bus signal paths, and wherein selectively configuring the subset of the plurality of signal paths for sideband communication comprises partitioning the plurality of signal paths into an InfiniBand link partition including the 1X bus signal paths and a sideband partition including at least one sideband signal path from one of the 4X and 12X bus signal paths.

9. The method of claim 8, wherein the InfiniBand link partition further includes the 4X bus signal paths.

10. A method of configuring an apparatus for communication with an Input/Output Adapter (IOA) of the type including a primary connector including a plurality of contacts configured to interface with a plurality of signal paths in the apparatus, the method comprising:
    (a) receiving sideband configuration information from the IOA, the sideband configuration information identifying at least one contact on the primary connector adapted for sideband communication; and
    (b) based on the sideband configuration information of the IOA, selectively configuring a subset of the plurality of signal paths in the apparatus for sideband communication;
    wherein the plurality of signal paths in the apparatus are routed to the primary connector of the IOA through a slot connector.

11. The method of claim 10, wherein detecting insertion of the primary connector of the IOA into the slot connector includes detecting a presence signal.

12. A method of configuring an apparatus for communication with an Input/Output Adapter (IOA) of the the including a primary connector including a plurality of contacts configured to interface with a plurality of signal paths in the apparatus, the method comprising:

(a) receiving sideband configuration information from the IOA, the sideband configuration information identifying at least one contact on the primary connector adapted for sideband communication; and (b) based on the sideband configuration information of the IOA, selectively configuring a subset of the plurality of signal paths in the apparatus for sideband communication;

wherein the plurality of signal paths in the apparatus are routed to the primary connector of the IOA through a slot connector; and wherein the contact adapted for sideband communication is coupled to first tri-state logic coupled to the primary connector on the IOA, and wherein at least one of the plurality of signal paths is adapted for sideband communication and coupled to second tri-state logic disposed in the apparatus and coupled to the slot connector, the method further comprising deselecting the first and second tri-state logic subsequent to selectively configuring the subset of the plurality of signal paths in the apparatus for sideband communication.

13. The method of claim 12, wherein receiving the sideband configuration information and selectively configuring the subset of the plurality of signal paths in the apparatus for sideband communication are performed prior to applying primary power to the IOA, the method further comprising applying primary power to the IOA subsequent to deselecting the first and second tri-state logic.

14. An Input/Output Adapter (IOA), comprising:

(a) a primary connector including a plurality of contacts and adapted to mechanically and electrically engage a slot connector in a host apparatus;

(b) tri-state logic coupled to a subset of the plurality of contacts that is adapted for sideband communication; and (c) configuration logic configured to output sideband configuration information for the IOA, the sideband configuration information identifying at least one contact in the subset of the plurality of contacts that is adapted for sideband communication wherein the primary connector form factor is compliant with the InfiniBand standard, wherein the primary connector includes 1X, 4X and 12X bus contacts, wherein the subset of the plurality of contacts that is adapted for sideband communication includes at least one 4X or 12X bus contact.

15. The IOA of claim 14, wherein a second subset of the plurality of contacts includes at least one 1X bus contact adapted to communicate over an InfiniBand link.

16. The IOA of claim 14, wherein the configuration logic includes vital product data (VPD) logic.

17. An Input/Output Adapter (IOA), comprising:

(a) a primary connector including a plurality of contacts and adapted to mechanically and electrically engage a slot connector in a host apparatus;

(b) tri-state logic coupled to a subset of the plurality of contacts that is adapted for sideband communication; and (c) configuration logic configured to output sideband configuration information for the IOA, the sideband configuration information identifying at least one contact in the subset of the plurality of contacts that is adapted for sideband communication;

wherein the primary connector form factor is compliant with the PCI standard and includes a plurality of 64-bit extension contacts, wherein the subset of the plurality of contacts that is adapted for sideband communication includes at least one of the plurality of 64-bit extension contacts.

18. The IOA of claim 17, wherein a second subset of the plurality of contacts includes contacts adapted to communicate over a 32-bit wide PCI bus.

19. An apparatus, comprising:

(a) a slot connector configured to electrically and mechanically engage a primary connector on an Input/Output Adapter (IOA), the slot connector including a plurality of contacts configured to interface with a plurality of contacts in the primary connector, the plurality of contacts in the primary connector including at least a subset of contacts adapted for sideband communication; and (b) control logic configured to receive sideband configuration information from the IOA via the slot connector that identifies at least one contact on the primary connector that is adapted for sideband communication, and, based on the sideband configuration information, to selectively configure a subset of the plurality of contacts on the slot connector for sideband communication;

wherein the control logic is further configured to configure the IOA to selectively enable a subset of the plurality of contacts in the primary connector for sideband communication based on the sideband configuration information.

20. The apparatus of claim 19, wherein the control logic includes a system management controller.

21. The apparatus of claim 19, wherein the slot connector has a form factor that is compliant with an industry standard I/O architecture form factor.

22. The apparatus of claim 19, wherein the control logic is configured to initiate retrieval of the sideband configuration information in response to detecting insertion of the primary connector of the IOA into the slot connector.

23. The apparatus of claim 19, wherein the control logic is further configured to check compatibility of the IOA prior to selectively configuring the subset of the plurality of contacts on the slot connector for sideband communication.

24. The apparatus of claim 23, wherein the contact adapted for sideband communication on the primary connector is coupled to first tri-state logic on the IOA, wherein at least one of the subset of contacts on the slot connector capable of being selectively configured for sideband communication is coupled to second tri-state logic coupled to the slot connector, and wherein the control logic is configured to deselect the first and second tri-state logic subsequent to selectively configuring the subset of the plurality of contacts on the slot connector for sideband communication.

25. The apparatus of claim 24, wherein the control logic is configured to apply primary power to the IOA subsequent to deselecting the first and second tri-state logic.

26. An apparatus, comprising:

(a) a slot connector configured to electrically and mechanically engage a primary connector on an Input/Output Adapter (IOA), the slot connector including a plurality of contacts configured to interface with a plurality of contacts in the primary connector, the plurality of contacts in the primary connector including at least a subset of contacts adapted for sideband communication; and (b) control logic configured to receive sideband configuration information from the IOA via the slot connector that identifies at least one contact on the primary connector that is adapted for sideband communication, and, based on the sideband configuration information, to selectively configure a subset of the plurality of contacts on the slot connector for sideband communication;

wherein the slot connector form factor is compliant with the PCI standard and includes a plurality of 64-bit extension contacts, and wherein the control logic is configured to selectively configure the subset of the plurality of contacts on the slot connector for sideband communication by partitioning the plurality of contacts on the slot connector into a 32-bit wide PCI bus partition and a sideband partition including at least one contact from the 64-bit extension contacts.

27. An apparatus, comprising:
(a) a slot connector configured to electrically and mechanically engage a primary connector on an Input/Output Adapter (IOA), the slot connector including a plurality of contacts configured to interface with a plurality of contacts in the primary connector, the plurality of contacts in the primary connector including at least a subset of contacts adapted for sideband communication; and
(b) control logic configured to receive sideband configuration information from the IOA via the slot connector that identifies at least one contact on the primary connector that is adapted for sideband communication, and, based on the sideband configuration information, to selectively configure a subset of the plurality of contacts on the slot connector for sideband communication;

wherein the slot connector form factor is compliant with the InfiniBand standard, wherein the slot connector includes 1X, 4X and 12X bus contacts, and wherein the control logic is configured to selectively configure the subset of the plurality of contacts on the slot connector for sideband communication by partitioning the plurality of contacts on the slot connector into an InfiniBand link partition including the 1X bus contacts and a sideband partition including at least one contact from one of the 4X and 12X bus contacts.

28. An Input/Output Adapter (IOA), comprising:
(a) a circuit board substrate;
(b) a primary edge connector coupled to the circuit board substrate and configured to electrically and mechanically engage a slot connector on a host apparatus, the primary edge connector extending in a first direction along an insertion axis; and
(c) a sideband edge connector coupled to the circuit board substrate and extending in the first direction, the sideband edge connector laterally offset from the primary edge connector in a direction transverse from the insertion axis and along a plane defined by the circuit board substrate, the sideband edge connector configured to communicate at least one sideband signal to or from the IOA.

29. The IOA of claim 28, wherein the primary edge connector comprises a plurality of contacts disposed on a tab defined on the circuit board substrate.

30. The IOA of claim 29, wherein the sideband edge connector comprises a plurality of contacts disposed on a tab defined on the circuit board substrate.

31. The IOA of claim 29, wherein the sideband edge connector comprises a paddle card mounted to a surface of the circuit board substrate.

32. The IOA of claim 28, wherein the primary and sideband edge connectors lie in the plane defined by the circuit board substrate.

33. The IOA of claim 28, wherein at least one of the primary and sideband edge connectors is offset from the plane defined by the circuit board substrate.

34. The IOA of claim 28, wherein the primary and sideband edge connectors extend to differing extents along the first direction.

35. The IOA of claim 28, wherein the IOA and the primary edge connector thereof are compliant with an industry standard Input/Output (I/O) architecture form factor, and wherein the sideband edge connector is located on the IOA at a location that does not conflict with the industry standard I/O architecture form factor.

36. The IOA of claim 28, wherein the primary edge connector comprises a PCI connector.

37. The IOA of claim 28, wherein the primary edge connector comprises an InfiniBand connector.

38. An apparatus, comprising:
(a) a slot connector configured to electrically and mechanically engage a primary edge connector of an Input/Output Adapter (IOA), the IOA of the type including a circuit board substrate to which the primary edge connector is coupled, wherein the IOA is configured to be engaged with the slot connector by inserting the primary edge connector in a first direction along an insertion axis along which the primary edge connector extends; and
(b) a sideband connector configured to communicate at least one sideband signal to or from the IOA, the sideband connector offset from the slot connector and configured to receive a sideband edge connector of the IOA when the primary edge connector of the IOA is inserted into the slot connector, the sideband edge connector extending in the first direction and laterally offset from the primary edge connector in a direction transverse from the insertion axis and along a plane defined by the circuit board substrate of the IOA.

39. The apparatus of claim 38, further comprising an IOA electrically and mechanically engaged with the slot and sideband connectors and including a primary edge connector and a sideband edge connector respectively configured to engage with the slot and sideband connectors.

40. The apparatus of claim 38, wherein the slot and sideband connectors extend to differing extents along the first direction.

41. The apparatus of claim 38, wherein the slot connector comprises a PCI connector.

42. The apparatus of claim 38, wherein the slot connector comprises an InfiniBand connector.

43. The apparatus of claim 38, further comprising a backplane including a plurality of slot connectors.

* * * * *